(12) United States Patent
Pomery

(10) Patent No.: US 7,697,963 B1
(45) Date of Patent: Apr. 13, 2010

(54) CELLULAR PHONE DOCKING STATION

(76) Inventor: David Pomery, 13 Ash Close, Little Stoke, Bristol, South Gloucestershire, BS346RE (GB)

(*) Notice: Subject to any disclaimer, the term of this patent is extended or adjusted under 35 U.S.C. 154(b) by 558 days.

(21) Appl. No.: 11/743,355

(22) Filed: May 2, 2007

(51) Int. Cl.
*H04M 1/00* (2006.01)
(52) U.S. Cl. .................... 455/572; 455/462; 455/426.1; 455/575.1
(58) Field of Classification Search ................ 455/425, 455/426.1–426.2, 462, 90.1–90.3, 550.1–553.1, 455/569.1, 571–575.1, 334, 347
See application file for complete search history.

(56) References Cited

U.S. PATENT DOCUMENTS

| | | | |
|---|---|---|---|
| 6,073,031 A * | 6/2000 | Helstab et al. ............. | 455/557 |
| 6,344,727 B1 | 2/2002 | Desai et al. | |
| D466,476 S | 12/2002 | Stratford | |
| 6,664,760 B2 | 12/2003 | Kobayashi | |
| 6,901,271 B1 * | 5/2005 | Cheah et al. ................ | 455/564 |
| 6,916,208 B2 | 7/2005 | Chen et al. | |
| 7,054,624 B2 | 5/2006 | Cocita | |
| 2002/0115480 A1 | 8/2002 | Huang | |
| 2005/0024011 A1 | 2/2005 | Chen | |
| 2008/0119241 A1 * | 5/2008 | Dorogusker et al. ........ | 455/573 |

* cited by examiner

*Primary Examiner*—Kamran Afshar
(74) *Attorney, Agent, or Firm*—Vincent Tassinari

(57) ABSTRACT

This patent discloses a docking station for a cellular phone. The docking station may include a housing, charger pins, keys, a red LED, a green LED, an upload button, a docking station memory, a signal emitter and a set of templates. The housing may have a slot, a cradle, an angled front face supporting the keys and LEDs, and a ledge supporting the upload button. A template may fit into the slot to adjust the cradle size to receive various cellular phones. The docking station may have electronics to receive and store phone contact information from a first cellular phone and upload that stored phone contact information into a second cellular phone. The signal emitter may send a disable signal to the first cellular phone.

18 Claims, 3 Drawing Sheets

CELLULAR PHONE DOCKING STATION

BACKGROUND

1. Field

The information disclosed in this patent relates to a cellular phone docking station that may charge a cellular phone and automatically retrieve a current record of a cell phone's internal phone book for storage.

2. Background Information

A cellular telephone (mobile telephone) is a long-range, portable electronic device for personal telecommunications over long distances. In addition to the standard voice function of a telephone, current mobile phones can support many additional services such as Short Message Service (SMS) for text messaging, email, packet switching for access to the Internet, and Multimedia Messaging Service (MMS) to send and receive photos and video. Most current mobile phones connect to a cellular network of base stations (cell sites), which is in turn interconnected to the public switched telephone network (PSTN), with an exception being satellite phones.

Because of their small size, cellular telephones are carried by individuals over other electronic devices such as a personal organizer, day planner, and personal planner. The cellular telephone industry encourages this by providing many features that overlap personal organizers. Cellular phones may operate as a calendar, address book, notebooks, and a host of other memory utilizing functions. Although important information may be safely stored within the memory of a cellular phone, if that cellular phone is lost, that important information may be lost with it. Thus, there is a need to backup data in a cellular phone to guard against data loss with the loss of a cellular phone.

SUMMARY

This patent discloses a docking station for a cellular phone. The docking station may include a housing, charger pins, keys, a red LED, a green LED, an upload button, a docking station memory, a signal emitter and a set of templates. The housing may have a slot, a cradle, an angled front face supporting the keys and LEDs, and a ledge supporting the upload button. A template may fit into the slot to adjust the cradle size to receive various cellular phones. The docking station may have electronics to receive and store phone contact information from a first cellular phone and upload that stored phone contact information into a second cellular phone. The signal emitter may send a disable signal to the first cellular phone.

DETAILED DESCRIPTION

Figure 1:
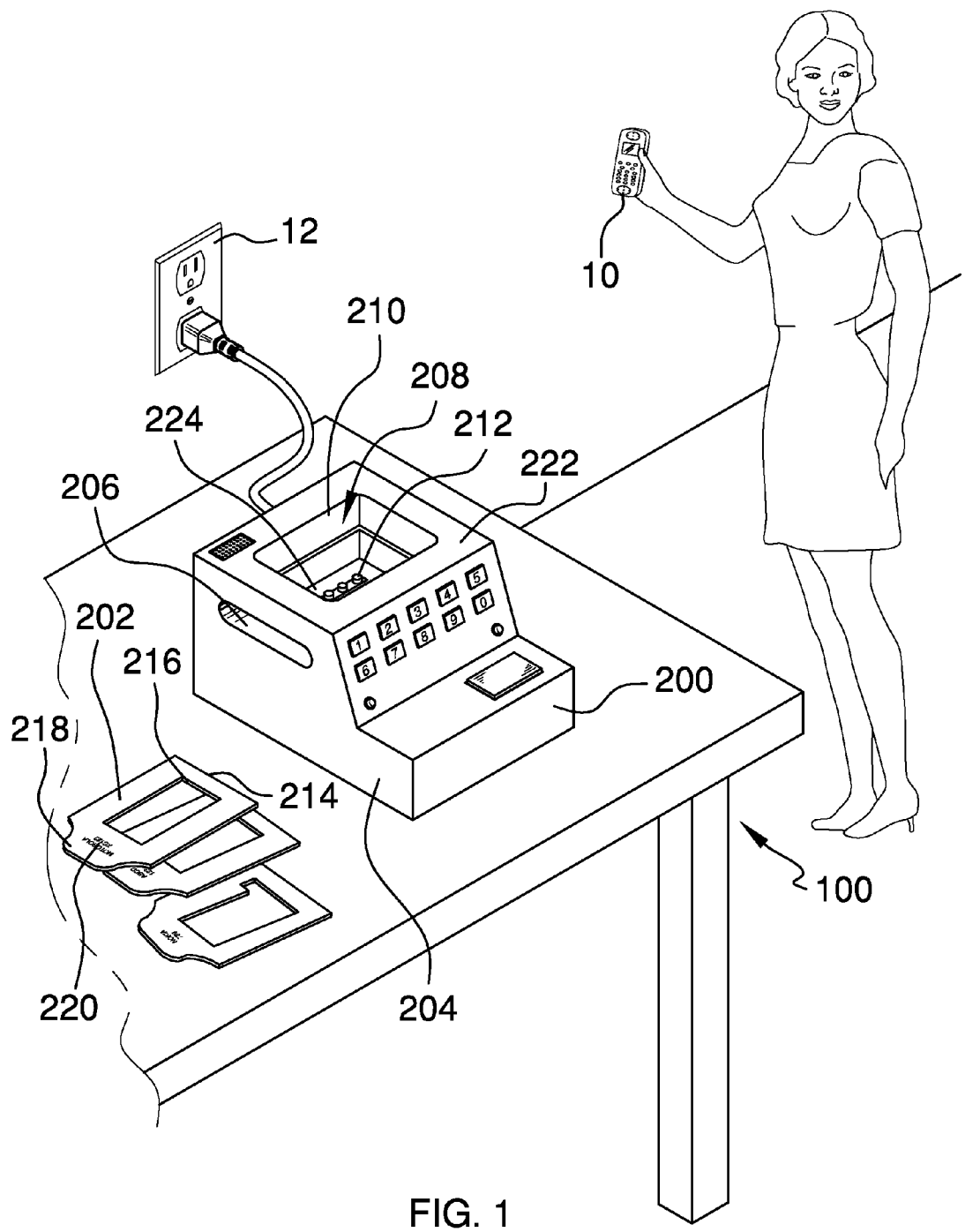
FIG. 1 is isometric view of a system 100.

FIG. 1 is isometric view of a system 100. System 100 may be a group of independent but interrelated elements that may cooperate together to charge and automatically backup data in a cellular phone 10. Backing up data stored within cellular phone 10 may guard against data loss with the loss of cellular phone 10.

System 100 may include a docking station 200 having templates 202. Docking station 200 may be configured to receive cellular phone 10 to charge cellular phone 10 and to automatically retrieve a current record of the internal phone book of cellular phone 10 for storage within docking station 10. Docking station 200 may include templates 202 and include a housing 204, a slot 206 formed in housing 204, a cradle 208 having a cradle mouth 210 formed in housing 204, and charger pins 212.

Each template 202 may be rigid form having a perimeter 214, an opening pattern 216, a handle 218, and a template identifier 220. Perimeter 214 may be an outer boundary of template 202. Perimeter 214 may have a rectangular shape that extends outward to form handle 218. Opening pattern 216 may be a cutout within template 202 having an interior boundary. Template 202 may be configured to move in and out of slot 206. Handle 218 may be that part of template 202 that can be used by hand to move template 202 in and out of slot 206.

Cellular phone 10 may include bare metal tabs built onto a bottom of cellular phone 10 that may be configure to mate with charger pins 212. Cellular phone 10 may come in a variety of sized. For each cellular phone 10, the bare metal tabs built onto the bottom of cellular phone 10 should align with charger pins 212 to pass power to cellular phone 10 and stored information from cellular phone 10. Accordingly, each opening pattern 216 may be positioned relative to perimeter 214 as a function of a particular cellular phone 10 and sized as a function of a particular cellular phone 10. For example, the positioning and size of opening pattern 216 for a first template 202 configured for Motorola RAZR V3—the thin clamshell mobile/cellular camera phone designed and manufactured by Motorola—may be different than the positioning and size of opening pattern 216 for a second template 202 for The Nokia N70—the multimedia 3G Smartphone made by Nokia and launched in Q3 2005. Template identifier 220 may be a description of each cellular phone 10 for which that particular template 202 may be used.

In one example, a positioning and size of opening pattern 216 for a first template 202 may be different than at least one of a positioning and size of opening pattern 216 for a second template 202. In another example, docking station 200 may include a set of templates 202, where each template includes an opening pattern 216 having a positioning and a size, and each positioning and size of each opening pattern 216 is different than the positioning and size of the opening pattern 216 in the templates 202 remaining in the set of templates 202.

Housing 204 may be a protective cover configured to contain and support features and components of docking station 200. In one example, housing 204 approximately may measure two inches high, three inches long, and three inches wide.

Slot 206 may be a narrow opening in housing 204 that may extend into and around cradle mouth 210 such that slot 206 may be configured to provide support around perimeter 214 of template 202 and positioning of template 202 relative to charger pins 212 when template 202 is fully inserted in slot 206.

Cradle 208 may be a deep depression within housing 204 that may include four sides positioned between a housing top 222 and a cradle bottom 224. Cradle bottom 224 may house charger pins 212. Cradle mouth 210 may be an opening in cradle 208 positioned near housing top 222. Cradle mouth 210 may be oversized. In one example, cradle mouth 210 may have a perimeter that may be at least two times a perimeter of cellular phone 10.

Charger pins 212 may metal extension leading from electronics within docking station 200 to an exposed positioned within cradle 208. Charger pins 212 may be part of a junction where charger pins 212 and the bare metal tabs built onto the bottom of cellular phone 10 touch in physical contact to connect the discrete components of cellular phone 10 to the electronics of docking station 200.

Figure 2:
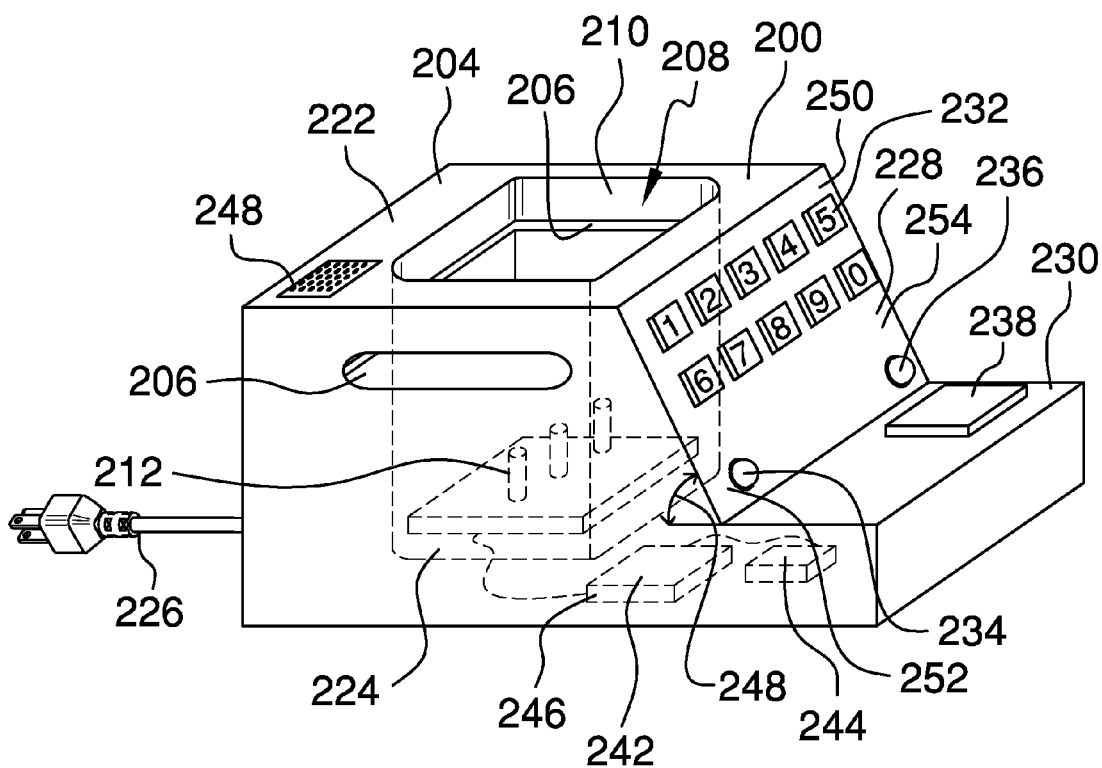
FIG. 2 is an isometric view of docking station 200.

FIG. 2 is an isometric view of docking station 200. As noted above, docking station 200 may include templates 202 (FIG. 1), housing 204, slot 206, cradle 208, cradle mouth 210, charger pins 212, housing top 222, and cradle bottom 224. In addition, docking station 200 may include a power cord 226, a front face 228, a ledge 230, keys 232, a red light emitting diode (LED) 234, a green LED 236, an upload button 238, and electronics 242, including a microprocessor 244, a docking station memory 246, and a signal emitter 248.

Power cord 226 may be a cable that may connect docking station 200 to an electrical power source, such as a wall outlet 12 (FIG. 1).

Front face 228 and ledge 230 may be exterior portions of housing 204. Ledge 230 may extend away from front face 228 and generally may be parallel to housing top 222. Front face 228 may be positioned between housing top 222 and ledge 230 at a front face angle 248 relative to ledge 230. In one example, front face angle 248 approximately may be sixty to seventy-five degrees.

Keys 232 may be a set of numbered switches that may be operated by pressing. In one example, keys 232 may be switches that only operate off of mechanical components. In another example, keys 232 may be electrical switches. Keys 232 may be numbered keys, 0 through 9, built onto a top 250 of front face 228. Keys 232 may be arranged in two rows, with keys one through five in a first row and keys six through zero in a second row positioned below the first row. As will be discussed, keys 232 may engage a combination lock that may unlock upload button 238 for use.

Red LED 234 may be a semiconductor device that may emit red spectrum light when electrically biased in the forward direction. Green LED 236 may be a semiconductor device that may emit green spectrum light when electrically biased in the forward direction. Underneath keys 232 on a lower left side 252 of front face 228 may be red LED 234. Underneath keys 232 on a lower right side 254 of front face 228 may be green LED 236. A lit red LED 234 may convey a message that cellular phone 10 (FIG. 1) is not fully charge. A lit green LED 236 may convey a message that cellular phone 10 (FIG. 1) is fully charge and current phone numbers stored in cellular phone 10 have been downloaded into docking station memory 246.

Upload button 238 may be a switch that may be operated by pressing. Upload button 238 may be positioned on ledge 230 beneath green LED 236. When pressed, upload button 238 may function to pass information from memory 242 of docking station 200 into a memory of cellular phone 10. Generally, upload button 238 may be inoperable. However, entering a proper combination into docking station 200 through keys 232 may unlock upload button 238.

As noted above, electronics 242 may include microprocessor 244, docking station memory 246, and signal emitter 248. Microprocessor 244 may contain the control unit, the arithmetic/logic unit, the registers, and the system clock needed to perform logical steps. Microprocessor 244 may be in communication with charger pins 212, docking station memory 246, signal emitter 248, power received through power cord 226, and in communications with other electronics 242 of docking station 200.

Docking station memory 246 may be an electronic storage place for microprocessor instructions and for data received from cellular phone 10. Memory may include permanent and temporary storage and be configured to be in communications with microprocessor 244. Signal emitter 248 may be configured to transmit a disable signal to a lost cellular phone 10.

Figure 3:
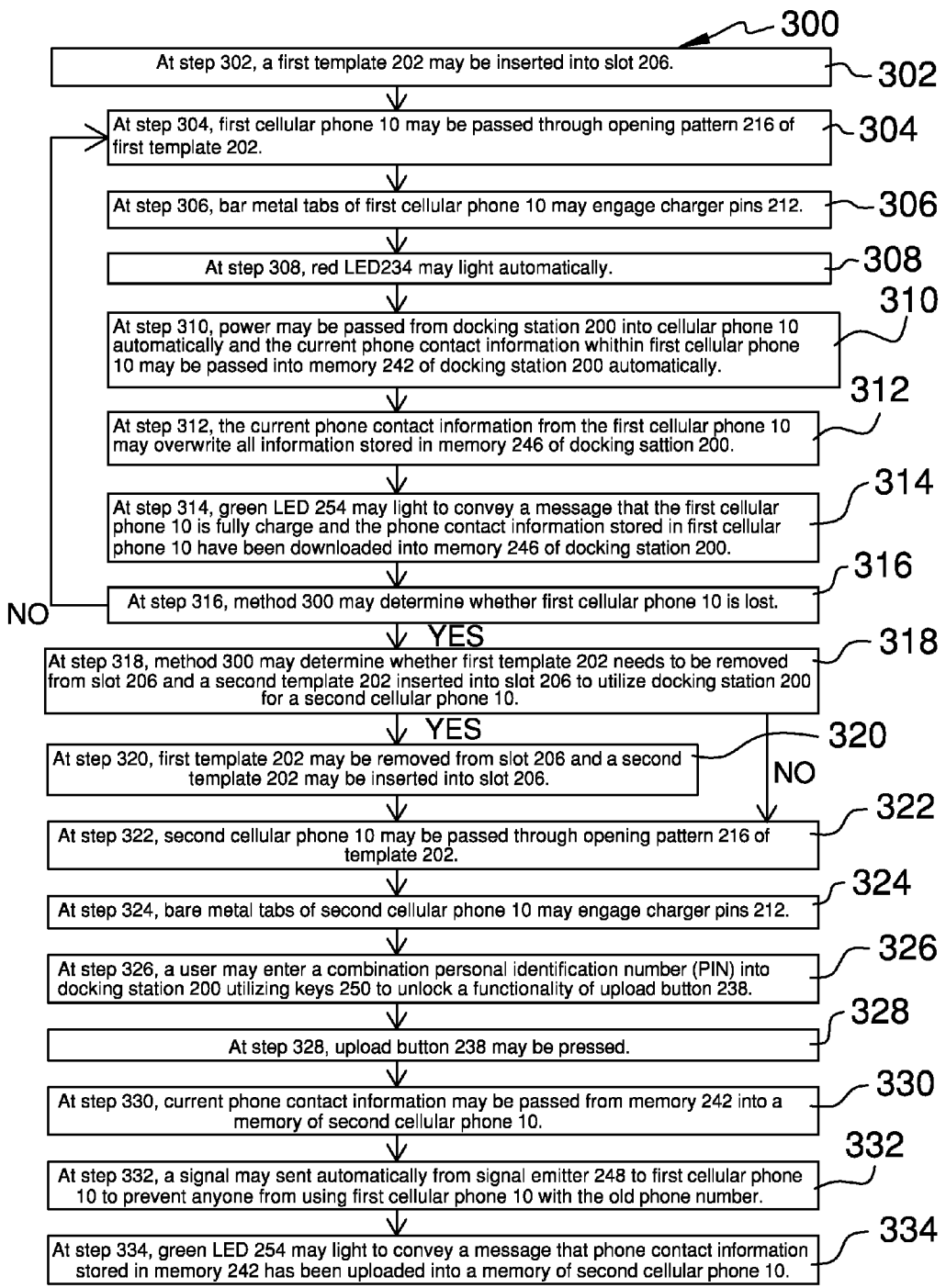
FIG. 3 is a method 300 to charge and automatically backup data in a first cellular phone 10.

FIG. 3 is a method 300 to charge and automatically backup data in a first cellular phone 10. At step 302, a first template 202 may be inserted into slot 206. At step 304, first cellular phone 10 may be passed through opening pattern 216 of first template 202. At step 306, bare metal tabs built onto the bottom of first cellular phone 10 may engage charger pins 212.

At step 308, red LED 234 may light automatically. At step 310, power may be passed from docking station 200 into cellular phone 10 automatically and the current phone contact information within first cellular phone 10 may be passed into memory 242 of docking station 200 automatically. The current phone contact information within first cellular phone 10 may include current phone numbers and names corresponding to those current phone numbers.

At step 312, the current phone contact information from first cellular phone 10 may overwrite all information stored in docking station memory 246. A reason for this is to keep the size and cost of docking station memory 246 to a minimum. At step 314, green LED 254 may light to convey a message that first cellular phone 10 is fully charge and phone contact information stored in first cellular phone 10 have been downloaded into docking station memory 246.

At step 316, method 300 may determine whether first cellular phone 10 is lost. If first cellular phone 10 is not lost, method 300 may return to step 304. If first cellular phone 10 is lost, method 300 then may proceed to step 318. At step 318, method 300 may determine whether first template 202 needs to be removed from slot 206 and a second template 202 inserted into slot 206 to utilize docking station 200 for a second cellular phone 10. If second cellular phone 10 is not listed in template identifier 220 of first template 202, then a second template 202 may be needed. If second cellular phone 10 is listed in template identifier 220 of first template 202, then first template 202 may be utilized.

If a second template 202 is needed, then method 200 may proceed to step 320. At step 320, first template 202 may be removed from slot 206 and a second template 202 may be inserted into slot 206. Method 300 then may proceed to step 322. If a second template 202 is not needed, then method 300 may proceed to step 322.

At step 322, second cellular phone 10 may be passed through opening pattern 216 of template 202. At step 324, bare metal tabs built onto the bottom of second cellular phone 10 may engage charger pins 212. At step 326, a user may enter a combination personal identification number (PIN) into docking station 200 utilizing keys 250 to unlock a functionality of upload button 238. At step 328, upload button 238 may be pressed. At step 330, current phone contact information may be passed from memory 242 into a memory of second cellular phone 10. At step 332, a signal may sent automatically from signal emitter 248 to first cellular phone 10 to prevent anyone from using first cellular phone 10 with the old phone number. At step 334, green LED 254 may light to convey a message that phone contact information stored in memory 242 has been uploaded into a memory of second cellular phone 10.

The docking station may be a home cellular phone charger that automatically may retrieve and store a current record of a cellular phone's internal phone book. The docking station may be plugged into a wall outlet. A cellular phone may be placed in a cradle built into a top of the docking station. A mouth of the cradle may be oversized. A number of templates may be available for placing into the hole—each template reducing the size of the mouth of the cradle to fit a different-sized cellular phone.

An overall shape of the docking station may be rectangular except for a sloping front with a small, protruding rectangular ledge at a bottom. There may be a set of numbered keys, zero through nine, built onto a top of the front face. Underneath the keys on a left side may be a red LED to indicate the cellular phone in the docking station was not yet fully charged. On a right side of the front face may be a green LED to indicate the cellular phone was fully charged with its current phone numbers downloaded to the device. Built onto the ledge may be an UPLOAD button.

Once a cellular phone is inserted into the cradle, bare metal tabs built onto a bottom of the cellular phone may be make contact with a row of metal charger pins in the bottom of the docking station, initiating the charging process. The docking station may download the current phone numbers (and corresponding names) automatically in the cellular phone from their storage area—either on the SIM card of the phone or in the internal AC chip memory of the phone (depending on the make and model of the phone). The new phone number information may overwrite the previous information inside the memory of the docking station, keeping a size of the memory to a minimum.

If a cellular phone was lost, a user simply may buy another cellular phone of the same make and model, for example, and insert that new cellular phone into the cradle of the docking station. Next, a PIN number may be entered using the numbered keys. Entering the pin number may unlock the UPLOAD button. Then, the UPLOAD button may be pressed to upload the phone numbers into the new phone. A signal may be sent to the old phone automatically to prevent anyone from using it with the old phone number. The docking station may be measure two inches high, three inches long, and three inches wide.

The docking station may fulfill a need for a home cellular phone charger that downloads a copy of the user's phone book into a new cellular phone in the event of a cellular phone being lost. Appealing features of the docking station may include its convenience, timesaving, ease of use, efficiency, and protection against information loss. Cellular phones have become central to the work and personal lives of many people. As cellular phones have gained in importance, they often become the main repository of phone numbers and other information. The result of losing all this information can make the loss of a cellular phone an extremely difficult experience. The docking station may work to reduce the harsh effects caused by this problem.

Whenever a cellular phone was charged in this unit, the cellular phone's entire phone book automatically may download to the internal memory of the docking station—overwriting the previous copy of the phone book. In addition, the docking station may charge the cellular phone in a solid, well situated device and eliminate the usual dangling wire. The red LED may be lit before the charging process was completed and the green LED lit afterwards. Thus, a user may tell at a glance if the cellular phone was finished charging.

Since cellular phones need to be charged routinely, a copy of that cellular phone's phone book inside the docking station may be kept up-to date without effort or need to remember to do anything. If the cellular phone was lost, the docking station may upload the entire phone book to the user's new cellular phone. A signal also may be sent automatically to the old phone to prevent anyone from using it with the old phone number (thus protecting the user from financial loss).

The docking station may be configured to charge a variety of different makes and models of cellular phones through the use of templates to resize an opening of the cradle on top of the docking station. When switching from one cellular phone to another, the docking station may provide an easy way to transfer the phone book from one device to another. In the event of theft or loss of the cellular phone, the phone numbers and other information may be easily retrieved from the memory of the docking station, thereby averting the embarrassing and laborious process of rebuilding the phone book contact by contact.

The information disclosed herein is provided merely to illustrate principles and should not be construed as limiting the scope of the subject matter of the terms of the claims. The written specification and figures are, accordingly, to be regarded in an illustrative rather than a restrictive sense. Moreover, the principles disclosed may be applied to achieve the advantages described herein and to achieve other advantages or to satisfy other objectives, as well.

What is claimed is:

1. A docking station for a cellular phone, the docking station comprising:
   a housing having a slot, a housing top, a front face, a ledge, a cradle having cradle mouth and a cradle bottom, where the ledge extends away from the front face and generally is parallel to the housing top, where the front face is positioned between the housing top and the ledge at a front face angle relative to the ledge, where the front face angle is between zero and ninety degrees;
   charger pins exposed in the cradle bottom;
   keys positioned at a top of the front face;
   a red LED positioned underneath the keys on a lower left side of the front face;
   a green LED positioned underneath the keys on a lower right side of the front face;
   an upload button positioned on the ledge beneath the green LED;
   a docking station memory configured to be in communication with the charger pins;
   a signal emitter configured to transmit a disable signal to a lost cellular phone; and
   a set of templates configured to be inserted into and removed from the slot.

2. The docking station of claim 1, where the cradle mouth has a perimeter that is at least two times a perimeter of a cellular phone to be charged.

3. The docking station of claim 2, where the front face angle approximately is sixty to seventy-five degrees.

4. The docking station of claim 3, where the slot is a narrow opening in the housing that extends into and around the cradle mouth such that the slot is configured to provide support around the perimeter of a template and configured to position the template relative to the charger pins when the template is fully inserted in the slot.

5. The docking station of claim 1, where the keys are numbered 0 through 9 and arranged in two rows, with keys one through five in a first row and keys six through zero in a second row positioned below the first row.

6. The docking station of claim 5, where the keys are switches that only operate off of mechanical components.

7. The docking station of claim 1, where the red LED is configured to light if a cellular phone is not fully charge and the green LED 236 is configured to light if a cellular phone is fully charge and current phone contact information stored in the cellular phone have been downloaded into the docking station memory.

8. The docking station of claim 1, where the upload button is configured to assist in passing phone contact information from the memory of docking station into a memory of a cellular phone.

9. The docking station of claim 8, where the upload button is inoperable if a combination has not been entered into the docking station through the keys.

10. The docking station of claim 1, where each template includes a perimeter, an opening pattern, a handle, and a template identifier.

11. The docking station of claim 10, where the perimeter has a rectangular shape that extends outward to form the handle.

12. The docking station of claim 11, where each opening pattern is positioned relative to the perimeter as a function of a particular cellular phone and is sized as a function of that particular cellular phone.

13. The docking station of claim 11, where a positioning and size of an opening pattern for a first template is different than at least one of a positioning and size of an opening pattern for a second template.

14. The docking station of claim 11, where each template includes an opening pattern having a positioning and a size, and each positioning and size of each opening pattern is different than the positioning and size of each opening pattern in the templates remaining in the set of templates.

15. The docking station of claim 1, further comprising:
a power cord and a microprocessor, where the microprocessor contains components to perform logical steps and is configured to be in communication with the charger pins, the docking station memory, and the signal emitter, where the docking station memory includes permanent and temporary storage, and where the housing approximately measure two inches high, three inches long, and three inches wide.

16. A method to charge and automatically backup data in a first cellular phone, the method comprising:
presenting a docking station having a housing having a slot, a housing top, a front face, a ledge, a cradle having cradle mouth and a cradle bottom, where the ledge extends away from the front face and generally is parallel to the housing top, where the front face is positioned between the housing top and the ledge at a front face angle relative to the ledge, where the front face angle is between zero and ninety degrees, where the docking station further includes charger pins exposed in the cradle bottom, keys positioned at a top of the front face, a red LED positioned underneath the keys on a lower left side of the front face, a green LED positioned underneath the keys on a lower right side of the front face, an upload button positioned on the ledge beneath the green LED, a docking station memory configured to be in communication with the charger pins, a signal emitter configured to transmit a disable signal to a lost cellular phone, and a set of templates configured to be inserted into and removed from the slot;
receiving a first template in the slot; and
receiving a first cellular phone in the cradle through the template and automatically receiving current phone contact information from the first cellular phone in the docking station memory, where the current phone contact information from the first cellular phone overwrites all the information stored in the docking station memory.

17. The method of claim 16, further comprising:
removing the first cellular phone from the cradle;
receiving a second cellular phone in the cradle through the template;
receiving a signal from the upload button; and
uploading the current phone contact information from the docking station memory into a memory of the second cellular phone.

18. The method of claim 17, further comprising:
receiving a combination in the docking station through the keys prior to uploading the current phone contact information from the docking station memory into a memory of the second cellular phone; and
sending a signal from the signal emitter to the first cellular phone to disable the first cellular phone.

* * * * *